(No Model.)  2 Sheets—Sheet 1.
W. H. FOYE.
DOUBLE ACTING REVERSIBLE GANG PLOW.
No. 302,833. Patented July 29, 1884.
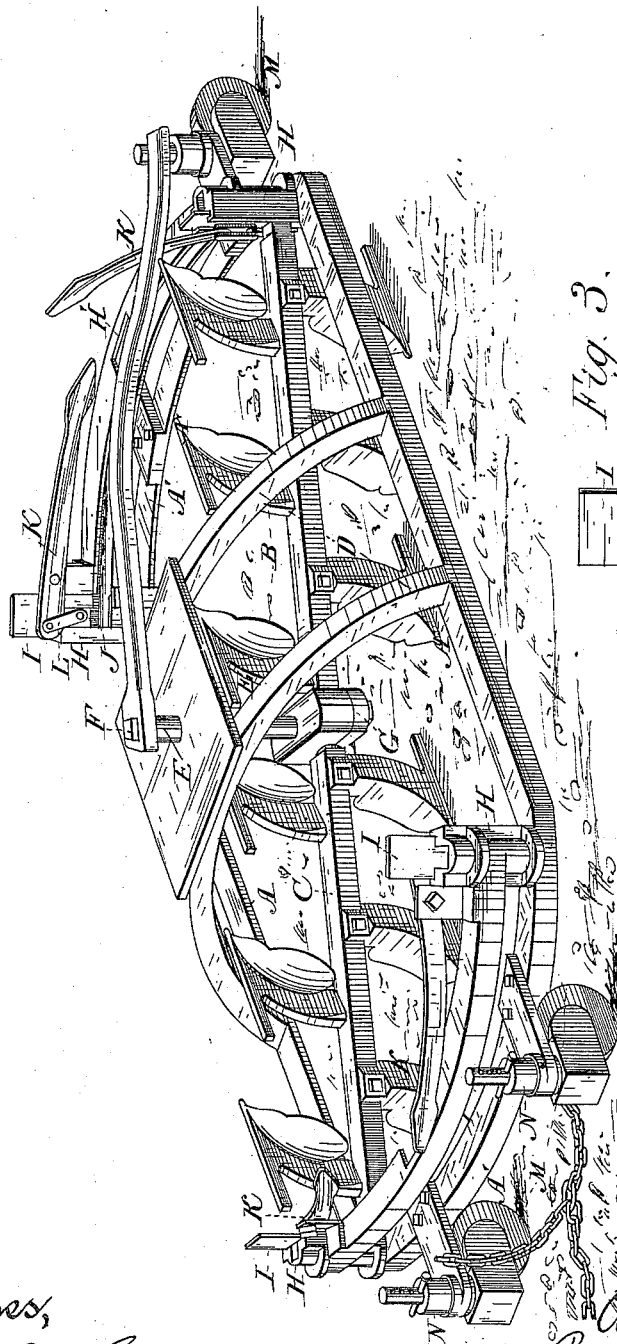
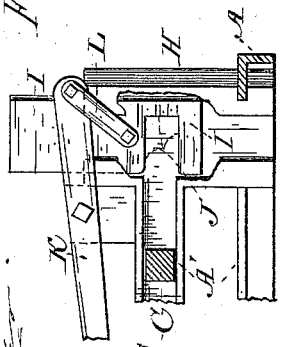
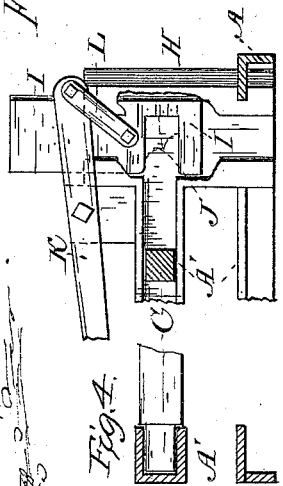
Witnesses,
Geo. H. Strong
J. H. Krouse
Inventor,
Wm. H. Foye
By
Dewey & Co.
Attorneys

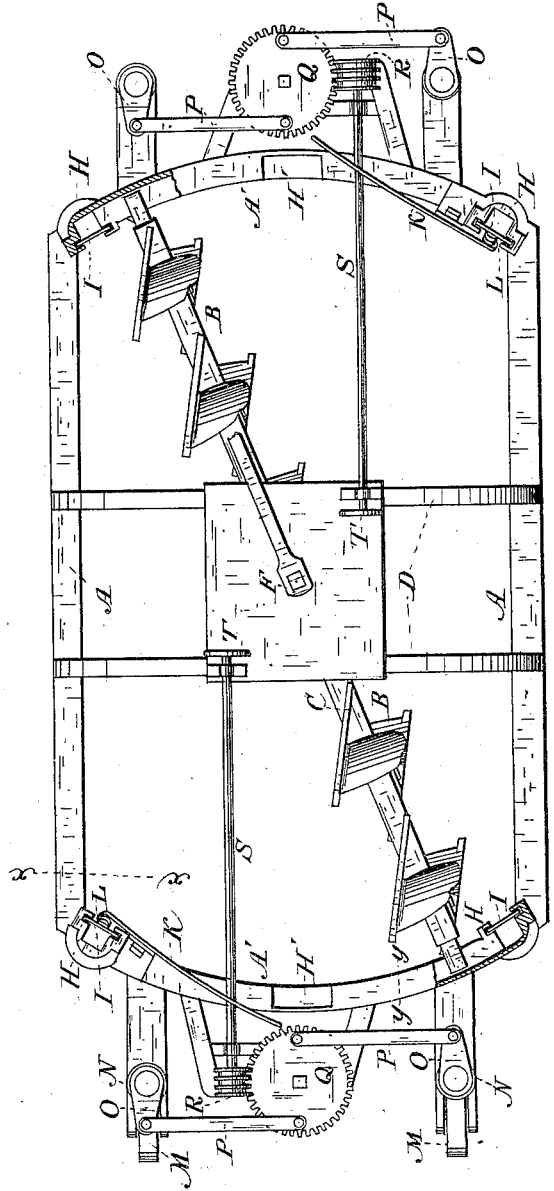

UNITED STATES PATENT OFFICE.

WILLIAM H. FOYE, OF SAN FRANCISCO, CALIFORNIA.

DOUBLE-ACTING REVERSIBLE GANG-PLOW.

SPECIFICATION forming part of Letters Patent No. 302,833, dated July 29, 1884.

Application filed May 16, 1884. (No model.)

*To all whom it may concern:*

Be it known that I, WILLIAM H. FOYE, of the city and county of San Francisco, and State of California, have invented an Improvement in Double-Acting Reversible Gang-Plows; and I hereby declare the following to be a full, clear, and exact description thereof.

My invention relates to certain improvements in gang-plows, and that class which are hauled across the field to be plowed by means of engines placed at one or both sides of the field or by other suitable means; and its object is to provide a plow to be operated by steam or other power that will plow forward and back upon the same landside without turning around.

It consists of a series of right and left hand plows secured at the proper angle on opposite sides of the plow-beam, with the points pointing in opposite directions to each other, so that when the right-hand plows are at work the left-hand plows will stand inverted on the upper side of the beam, with their points standing in the opposite direction to the line of travel. The beam may be provided with any number of plows cutting different widths of furrow, or any other tools used in working the soil. The plow-beam is square at the ends, and provided with a bearing at equal distance from each end, which holds it firmly in a position to swivel around on the arc of a circle, and when at a point parallel with the side frames to revolve or capsize, bringing the right-hand plows that have completed their cut to the top of the beam, exchanging places with the left ones, so that the plow may start on its return cut upon the same landside without turning around.

My invention further consists of a frame in which the plow-beam is mounted, provided with slots at each of the four corners, through which the end of the plow-beam works, and is depressed to give the required depth of cut, and elevated for the purpose of changing the position of the plows from right to left hand work; a means by which the beam is raised in the slots at each corner of the frame; channel-ways, in which the ends of the plow-beam travel from a right to left hand corner; also, caster-wheels which support and carry it, and steering-gear by which it is guided across the field, and means by which the beam is supported at the bearing on the center of the frame.

Referring to the accompanying drawings for a more complete explanation of my invention, Figure 1 is a perspective view of my apparatus, showing one set of plows in position for work. Fig. 2 shows the position of plows while being reversed. Fig. 3 is a transverse section on the line $x\ x$, Fig. 2, and elevation of the guide-posts. Fig. 4 is a section on the line $y\ y$, Fig. 2.

A is a frame of suitable dimensions to receive a gang of plows of any desired number. In the present case I have shown each gang as containing six plows; but any other number might be used. The plows B are fixed upon opposite sides of a straight beam, C, so that when one set of plows is in position to take the ground in one direction the other set projects upward from the top of the beam and points in the opposite direction, as shown in Fig. 1. When one set of plows is being used, this beam extends diagonally from one corner of the frame A to the opposite corner, and when it is reversed, so that the other set of plows is being used, the beam will extend diagonally between the other two opposite corners. The width of the frame, and its relative proportion to the length of the beam, is such that this diagonal position holds the landsides of the plows parallel with the direction of travel, with each plow the proper distance in advance of and to one side of the next following, so as to cut and turn the furrows properly. In order to allow the beam to be turned so as to stand diagonally between either two corners of the frame, the ends of the frame are segments or curves A', the arc of which is formed by a radius from the central point between the two ends. These segments are preferably made of channel-iron or with horizontal channels, between which the opposite ends of the beam may travel as it is turned from side to side. Across the center of the frame from the side bars, A A, the arch D extends, curving high enough in the center to allow the plows to be revolved with the beam as an axis, without coming in contact with it. A sleeve, E, extends vertically through the center of this arch, or is supported by it, and a vertical shaft, F, passes through this sleeve, so as to turn loosely within it. It has a lever or other device at the top for the purpose of swinging the plow-beam to the opposite corners of the frame, to change the position from right to left hand plowing. Upon the lower end of this vertical shaft is a box, G, through which the central portion of the plow-beam C passes and revolves. The beam is made round at this point, so that it may turn freely within this box when desired, and the vertical movement of the shaft F within the sleeve allows the box and the plow to be moved up or down when it is in the proper position for plowing, to give the plows more or less depth of cut. The slots (channels) in the ends of the frame A' are of sufficient width to allow the square ends of the beam to slide within them without turning, except at a central point, where the upper part is cut away, as shown at H'. When the beam stands directly in line parallel with the sides of the frame, its ends are within this portion H', and it may then be turned over by hand or by any suitable means, so that the plows which are uppermost can be turned down, ready to be moved to their proper position, and then lowered into the ground; or the beam may be turned so that the two sides of the plow stand horizontally and neither of them touch the ground, in which position it is moved from one field to another when it is desirable.

In order to hold the plow-beam in its diagonal position when either set of plows is at work, and to enable the operator to depress the plows as much as may be desired to cut the desired depth of furrows, vertical posts H are formed at each end of the segmental ends A' of the frame, having also vertical slots corresponding with and opening into the channels in the curved ends, so that the ends of the beam, as they slide around the channels in the end frames, may slide into these vertical slots, which are of the same dimensions as the horizontal ones formed in the end pieces. As the ends of the beam are square, it will be seen that when they reach these vertical slots they may be allowed to move down within them, the two vertical sides of the slots serving as guides and to steady the beam, instead of the horizontal sides, which serve this purpose while the ends are within the channels of the end pieces.

In order to control the vertical movements of the ends of the plow-beam, slides I are fitted to move in the vertical guiding-slots in the corners H of the frame, and these slides have horizontal slots J made in them, which correspond with the diameter of the channels in the curved ends of the frame, so that when the beam has been swung around its central box and standard, to bring its two ends into the vertical corner-slots in H, these ends lie within the slots J of the slides I. Levers K have their fulcrums upon the end frames, and their short arms are connected with slides I by links L, their long arms extending toward the center of the end frames, so as to be within convenient reach; and they may have any suitable or desired rack or locking mechanism, by which they may be held in any required position. It will be seen that when the opposite ends of the plow-beam are within the vertical slots of two opposite corners, lying also within the slots in the guides, by lifting the inner ends of the levers K upon these two opposite slides, they will force the ends of the beam down, so that the plows which are then in position may be made to cut as deep furrows as may be desired.

M M are caster-wheels, with their shanks suitably supported in vertical hollow guides or posts N, so that they may turn freely in any desired direction, and are provided with holes and pins in the shaft, by means of which they may be set higher or lower to regulate the depth of furrow. In order to control the movements of these caster-wheels, and turn them so as to guide the plow-frame and cause the plows to run straight, or to take more or less land, as desired, the upper ends of the shanks of the standard of the caster-wheels have short horizontal projecting crank-arms O. These arms are connected with a worm-wheel, Q, by rods or links P. This worm-wheel has a screw, R, which engages it so that it may turn in one direction or the other, and the shaft S of the screw may lead toward the center of the frame, if the operator rides, or to any desired point, where it may have a hand-wheel, T, fixed to it, by which the operator may turn the screw and worm-wheel, and thus through their action turn the caster or bearing wheels M to one side or the other, so as to guide the plows as may be desired.

Having thus described my invention, what I claim as new, and desire to secure by Letters Patent, is—

1. In a gang-plow, the beam having two sets of plows fixed to opposite sides of it, pointing in opposite directions, said beam having central and end supports about which it may be rotated and turn so as to stand diagonally to the line of travel of the machine, so that one set of plows may be used while the machine travels in one direction, and the other in the other direction.

2. In a gang-plow, the beam having two sets of plows secured upon opposite sides, and pointing in opposite directions, with their landsides in planes diagonal to the axis of the beam, and the frame having curved channeled ends within which the ends of the plow-beam may move about the central support, and within which the beam may be turned so as to reverse the plows, as herein described.

3. In a gang-plow, a beam having two sets of plows secured to opposite sides, and diagonally thereto, as shown, a main frame having channeled ends curved in arcs of circles about a central point, a box at this central point within which the plow-beam is supported and may turn, and a vertical shaft supporting said box and turning within a guide-sleeve, which is supported above the center of the plow-beam and forms an axis about which it may be moved in a horizontal plane, as described.

4. A plow-beam having two sets of plows secured to its opposite sides, as shown, a central swiveling box within which the center of the beam is supported, a main frame having the ends formed in arcs of circles of which this box is the center, and channeled to receive the ends of the plow-beam and allow it to travel horizontally from side to side, and vertical slots at the ends of these arcs corresponding with the horizontal channels, as herein described.

5. In a gang-plow, the plow-beam having two sets of plows supported diagonally thereto from opposite sides, the curved channel ends within which the ends of this beam may move from side to side about a central support, and posts situated diagonally opposite each other at the ends of the arcs, and having vertical slots corresponding with those in the arcs, together with slides I, having slots J, and moving in vertical guides within the posts, as described.

6. In a gang-plow, a beam having two sets of plows secured diagonally upon opposite sides of it, a main frame with curved channeled ends within which the ends of the plow-beam move horizontally about a central point and support, vertical slots at the ends of the arcs and diagonally opposite each other, guides moving vertically within these slots, into which the opposite ends of the plow-beam may pass, and levers by which these guides may be moved down to cause the plows to enter the ground, or upward to take them out, as herein described.

7. In a gang-plow, a beam having two sets of plows secured upon opposite sides diagonally to it, horizontal curved channeled ends within which the ends of the beam may be moved about a central adjustable swiveling support, and openings or enlargements in the channeled ends, whereby the plow-beam may be turned or reversed, as described.

8. In a gang-plow, the beam having two sets of plows secured to opposite sides diagonally thereto, curved channeled ends within which the beam may swing about the central point, so as to stand within the frame diagonally to the line of travel of the machine, supporting or guiding wheels M, with vertical shafts, crank-arms, and operating worm-gear, and connecting rods or links, as herein described.

In witness whereof I have hereunto set my hand.

WILLIAM H. FOYE.

Witnesses:
S. H. NOURSE,
C. D. COLE.